United States Patent [19]

Bourgade et al.

[11] Patent Number: 4,765,749
[45] Date of Patent: Aug. 23, 1988

[54] QUASI-ADIABATIC CALORIMETER FOR MEASURING THE ENERGY TRANSPORTED BY RADIATION

[75] Inventors: Jean-Luc Bourgade, Brunoy; Michel Le Guen, Villecresnes; Alain Saleres, Noisy le Grand, all of France

[73] Assignee: Commissariat a l'Energie Atomique, Paris, France

[21] Appl. No.: 941,813

[22] Filed: Dec. 15, 1986

[30] Foreign Application Priority Data

Dec. 19, 1985 [FR] France ............... 85 18853

[51] Int. Cl.$^4$ .......................... G01K 17/20
[52] U.S. Cl. .................. 374/32; 250/352; 374/2; 374/134
[58] Field of Search .......... 374/32, 2, 178, 134; 250/352

[56] References Cited

U.S. PATENT DOCUMENTS

| | | | |
|---|---|---|---|
| 3,006,157 | 10/1961 | Haettinger et al. | 250/352 |
| 3,115,030 | 12/1963 | McHenry | 374/2 |
| 3,354,309 | 11/1967 | Volkovisky | 250/352 X |
| 3,368,076 | 2/1968 | Clifford | 250/352 |
| 3,596,514 | 8/1971 | Mefferd et al. | 374/32 |
| 3,641,346 | 2/1972 | Lachambre | 350/1 X |
| 3,694,624 | 9/1972 | Buchta | 374/2 X |
| 3,783,685 | 1/1974 | Zeiders, Jr. et al. | 374/32 |
| 3,821,895 | 7/1974 | Sumikawa et al. | 374/31 X |

FOREIGN PATENT DOCUMENTS 2050603  2/1971  France .

OTHER PUBLICATIONS

Mayor J-M, Journal of Physics E: Scientific Instruments 1973, vol. 6; (1973) pp. 559–560.
McCormick, 2450 EOSD–Electro-Optical Systems Design, vol. 14 (1982) Dec. No. 12, pp. 35–46.

Primary Examiner—Daniel M. Yasich
Attorney, Agent, or Firm—Oblon, Fisher, Spivak, McClelland & Maier

[57] ABSTRACT

Calorimeter for measuring the energy transported by radiation. This calorimeter comprises an absorbing element able to absorb radiation and having an outer face exposed to the radiation and an inner face, said element undergoing a temperature rise during the interaction with the radiation. This temperature rise is measured by a thermopile. The calorimeter also comprises calibration means constituted by a strip-like resistive deposit in direct contact with the inner face of the absorbing element over at least 50% of the surface thereof. Application to the measurement of the energy transported by electromagnetic radiation or a particle flux.

12 Claims, 5 Drawing Sheets

QUASI-ADIABATIC CALORIMETER FOR MEASURING THE ENERGY TRANSPORTED BY RADIATION

BACKGROUND OF THE INVENTION

The present invention relates to a calorimeter for measuring the energy transported or transmitted by electromagnetic radiation (light, X, laser, etc.) or by a particle flux. It is more particularly used in optoelectronics in measuring pulse-type photon energy transported by laser radiation.

Calorimeters are known in which measurement takes place of the temperature increase produced by the interaction of electromagnetic radiation and a material able to absorb said radiation and the energy transported by the radiation is deduced from this measurement. Generally such calorimeters comprise a radiation absorbing element having an outer face exposed to the radiation and an inner face. The absorbing element undergoes a temperature increase during the interaction with the radiation. A thermopile having a measuring face in contact with the inner face of the absorbing element and a reference face kept at reference temperature supplies a potential difference proportional to the temperature difference between its measuring and reference faces. These calorimeters are generally equipped with calibration means, which can comprise a resistance wire adhered to the inner face of the absorbing element or to the peripherary thereof. The function of this wire is to simulate an energy "deposit" of a clearly defined value by heating the absorbing element through the passage of electric current, thus permitting the calibration of the calorimeter. FR-A- No. 2 050 603 describes such a calorimeter.

Such calorimeters suffer from several disadvantages. Firstly the sensitivity is low, because the thermopile covers virtually the entire inner face of the absorbing element and consequently has a high calorific capacity compared with that of the absorbing element. Moreover, calibration is not very reliable, because the simulation of the energy deposit by electric heating of the resistance wire is not satisfactory, the wire only covering a small part of the inner face of the absorbing element or is placed on its peripherary. Finally, calibration is difficult and not very reproducible, because the operation of gluing the wire to the inner face or peripherary of the absorbing element is difficult and not very effective, because at certain points the wire can become unstuck.

SUMMARY OF THE INVENTION

The object of the present invention is to obviate these disadvantages by proposing a calorimeter having a great sensitivity and easily reproducible calibration making it possible to simulate in an almost perfect manner an energy deposit in the absorbing element.

More specifically the present invention relates to a calorimeter for measuring the energy transmitted by radiation comprising in known manner an absorbing element able to absorb said radiation and having an outer face exposed to the radiation and an inner face, said element undergoing a temperature increase during interaction with said radiation, means for measuring the temperature increase, said measuring means using part of the surface of the inner face of the absorbing element and a calibration resistance or resistor on the inner face of the absorbing element.

According to the invention, the calibration resistance is in the form of a resistive material coating deposited on that part of the surface of the inner face of the absorbing element not used by the measuring means, said coating being in direct contact with said inner face of the absorbing element over at least 50% of the surface thereof.

Preferably the resistive deposit or coating is in direct contact with the inner face of the absorbing element over at least 70% of the surface thereof and in the calorimeters which have been produced the resistive deposit covers approximately 80% of said surface. This resistive deposit can comprise at least one homogeneous continuous strip which can be supplied with current and has a length to width ratio of approximately 100.

According to a preferred embodiment of the calorimeter according to the invention, the material constituting the resistive deposit comprises at least one conductive ink which can be polymerized.

According to another aspect of the invention, the means for measuring the temperature increase of the absorbing element comprise at least one thermopile having a measuring face in contact with the inner face of the absorbing element and a reference face, said thermopile occupying at the most 20% of the surface of the inner face of the absorbing element, means for maintaining the reference face of the thermopile at a reference temperature and means for measuring the voltage at the terminals of the thermopile produced during the interaction of the radiation and the absorbing element.

For example, this thermopile can be a semiconductor thermopile.

According to a special embodiment of the invention, the means for maintaining the reference face of the thermopile at a reference temperature comprise an element in contact with said reference face, said element having an at least 5 times greater mass than that of the thermopile.

According to another aspect of the invention, the absorbing element comprises a first coating of a material able to absorb the radiation, e.g. a glass coating, said first coating having an outer face exposed to the radiation and an inner face and a second coating of a lateral heat conduction material positioned between the first coating and the thermopile, said second coating being in contact with the inner face of the first coating and with the measuring face of the thermopile.

According to another aspect of the invention, on the side of its inner face, the absorbing element has a thin insulating film, the resistive deposit being in direct contact with said insulating film.

This arrangement is particularly useful in the case where that part of the absorbing element corresponding to the inner face is metallic, e.g. in the aforementioned case where the absorbing element is constituted by a first coating of a material such as glass and in which the lateral heat conduction material constituting the second film is of metal. In this case, the metal undergoes surface oxidation over a limited depth (approximately 10 to 20 micrometers) prior to the deposition of the calibration resistance. Thus, the latter is not in direct contact with the metal, but with the oxide (which is an electrical insulation), so that short-circuits are prevented.

The calorimeter according to the invention can have a plurality of thermopiles, each having a measuring face and a reference face, the latter being in contact with the inner face of the absorbing element, all the thermopiles covering at the most 20% of the inner surface of the absorbing element.

The present invention also relates to a process for producing such a calorimeter. According to the main feature of this process, the calibration resistance is deposited by screen process or silk screen printing. According to another feature of this process, the first and second coatings of the absorbing element are assembled by a thermoconductive glue layer deposited by slik screen printing.

The calorimeter according to the invention can in particular be used for measuring the pulse-type photon energy transported by a radiation having a wavelength between 0.3 and 2 μm.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
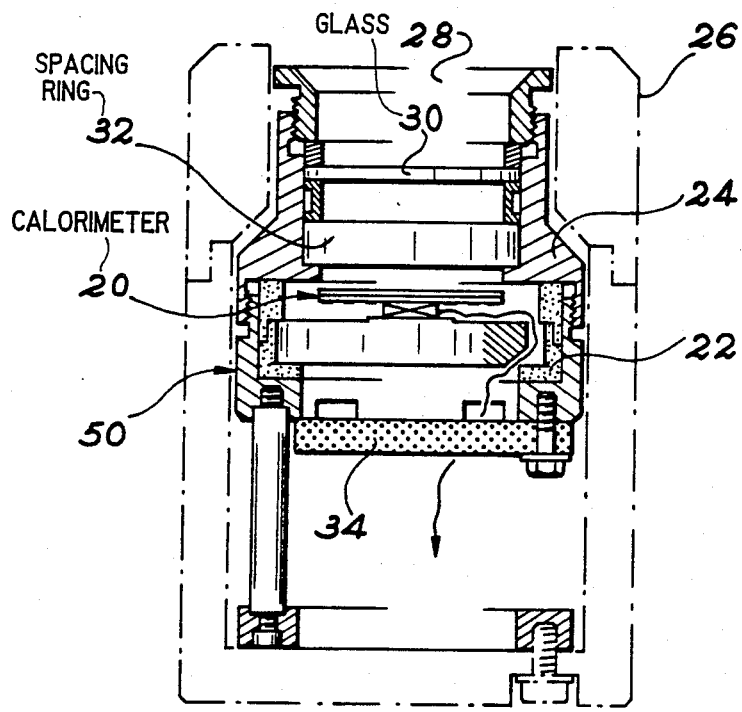
FIG. 1—A diagrammatic sectional view of the calorimeter according to the invention placed in a case.

FIG. 1 shows that the calorimeter according to the invention 20 is placed in a case 50 and is mounted on an insulating spacer 22 keeping calorimeter 20 in a stable, invariable position. Spacer 22 is covered with a metal envelope 24.

The upper part of case 50 has a central opening 28 extending up to calorimeter 20 to enable the incident radiation to interact therewith. Protective glass 30 seals the central opening 28 to protect the calorimeter from corrosive atmospheres during the periods of non-use. A spacing ring 32, on which can be placed a filter, is positioned between the protective glass 30 and calorimeter 20.

The lower face of case 50 comprises a lead screen 34 serving to stop parasitic radiation when measuring the energy transported or transmitted by X radiation having a hard component. The case 50 can be covered with an insulating envelope 26 protecting it from temperature fluctuations of the ambient medium, which makes the calorimeter quasiadiabatic.

Figure 2:
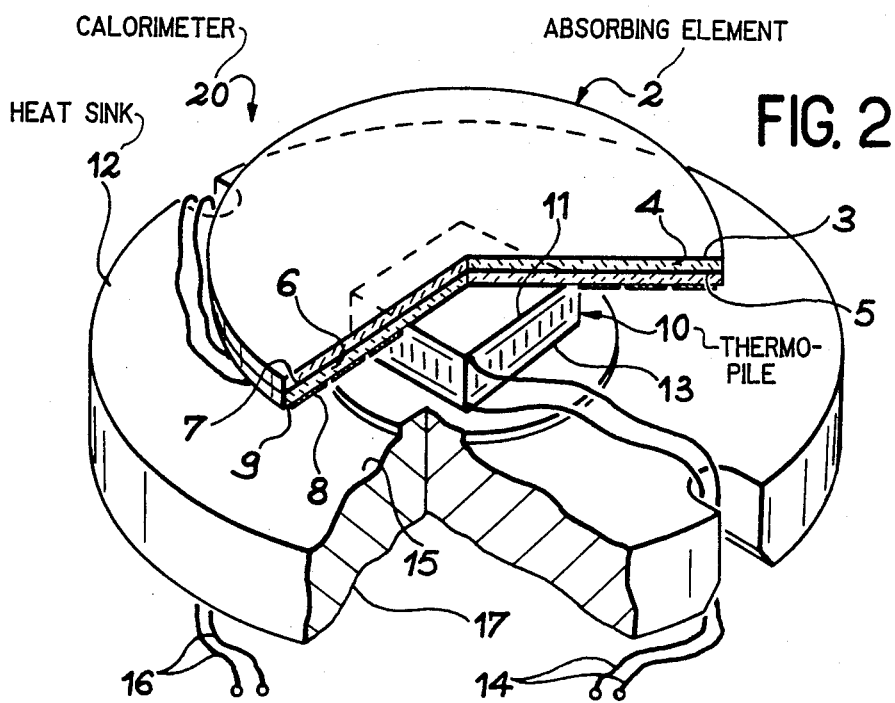
FIG. 2—A diagrammatic perspective and part sectional view of the essential components of the calorimeter according to the invention.

On referring to FIG. 2, it can be seen that the calorimeter 20 firstly comprises an absorbing element 2, which has an outer face 3 exposed to the incident radiation and an inner face 9. Absorbing element 2 is subject to a temperature rise during the interaction with the radiation. In the particular case shown here (photon calorimeter), the absorbing element 2 comprises a first coating 4 of a material able to absorb radiation having an outer face 3 exposed to the radiation and an inner face 5 and a second coating 6 of a lateral heat conduction material having an outer face 7 in contact with the inner face 5 of the first coating 4 and an inner face 9. In the present description, the term "outer face" of the absorbing element 2 or the coatings forming the same is considered to be that face of said elements located on the side by which arrives the radiation to be studied, whilst the "inner face" is the other face. The material of the first coating 4 can be an absorbing glass, whose function is to undergo a temperature rise during the interaction with light radiation. The function of the material of the second coating 6 is to rapidly equalize the temperature heterogeneities of the first coating 4. Thus, the incident radiation is not always homogeneous and can produce hot points in the mass of the first coating 4. The second coating 6 must be a good heat conductor and have a perfect adhesion to the elements in contact with its outer face 7 and inner face 9. The second coating must also have an adequate electrical insulation with respect to the elements in contact with its inner face 9, i.e., the thermopile 10 which will be described hereinafter and the resistive deposit 8.

To meet these requirements, the material of the second coating 6 can be a ceramic or some other material having the property of being both a heat conductor and an electrical insulator. The material of the second coating 6 can also be a metal, an alloy or a charged or filled metal, which are good heat and electricity conductors and for which a deposit of an insulating coating is necessary on inner face 9. The second coating 6 can be in the form of one or more thin sheets directly adhered to the inner face 5 of the first coating 4. It is also possible to obtain the second coating 6 by one of the following deposition processes: vacuum evaporation, chemical vapour phase deposition, sputtering or polymerization in the case of charged or filled products.

For example, a calorimeter according to the invention has been produced for measuring the energy transported by laser radiation with a wavelength of 0.3 to 2 μm. In this example, the first and second coatings 4 and 6 of absorbing element 2 are circular and have a thickness close to 0.5 mm and a diameter of approximately 30 mm in each case. The first coating 4 is of glass like that sold by the Schott company under reference NG1 and the second coating 6 is an aluminium pellet previously aluminized on its outer surface 7. The obtaining of an alumina film (10 to 20 micrometers thick) can e.g. take place by anodic oxidation. The thus obtained film is an electrically insulating film, which obviates shortcircuits between the calibration resistance and the metal coating, but it is a good heat conductor. Thus, the heat given off by the Joule effect in the calibration resistance is rapidly transmitted to the absorbing element.

The glass coating and metal film are assembled by means of a boron-filled, thermoconductive glue deposited by screen process printing in uniform manner on the outer face 7 of the second coating 6. This procedure makes it possible to obtain a glue thickness of approximately 50 to 100 μm, facilitating the reproduction of this assembly.

It is obvious that this is only an example and that without passing beyond the scope of the invention the coatings of the absorbing element 2 could be in a different form and could be assembled by a different procedure.

In the case of measuring energy transported by particle flux or X radiation, the first glass coating 4 can be eliminated, because the metals absorb the ions and X radiation and reflect the photons, whereas the glass also absorbs the photons. Thus, only coating 6 is left and serves both as an absorbent and as a heat equalizer.

Figure 3:
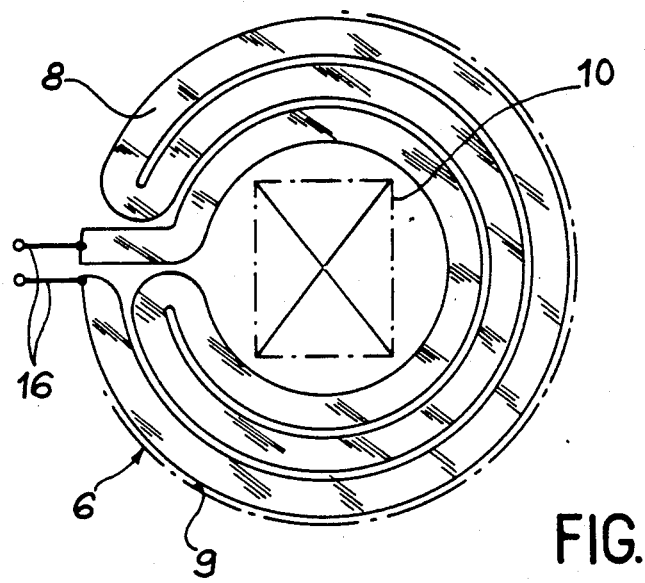
FIG. 3—A diagrammatic view from below showing a possible arrangement of the resistive deposit and the thermopile of the calorimeter according to the invention.

At 8 is shown the strip-type resistive deposit used for the calibration of the calorimeter according to the invention and which covers part of the inner face 9 of second coating 6 of absorbing element 2. In a possible arrangement of resistance or resistor 8, represented in FIG. 3, it can be seen that resistance 8 covers in the form of a homogeneous, continuous strip approximately 80% of the surface of inner face 9 of the second coating 6. In the calorimeter produced, the length to width ratio of resistance 8 is approximately 100. The width of the strip was approximately 2 mm and the radial distance between two concentric parts of the strip approximately 0.5 mm. The thermopile 10, which will subsequently be described, occupies the central part of inner face 9 of the second coating 6, which is not occupied by the resistive deposit 8. Obviously this is a preferred arrangement of the resistance, but without passing beyond the scope of the invention said resistance could be arranged in a different form.

The calorimeter is calibrated by electric heating of resistance 8, which simulates by the Joule effect an energy deposit in absorbing element 2. The greater the surface of inner face 9 of the second coating 6 covered by resistance 8 and the smaller its thickness, the more the simulation approaches the absorbing element-radiation interaction.

According to a preferred embodiment, resistance 8 is deposited by silk screen printing. In the embodiment produced, the constituent material of the resistance 8 was a mixture of conductive inks polymerizable at a temperature close to 150° C. The product used was constituted by a polymer to which were added a first conductive ink charged with silver and a second resistive ink charged with palladium. Thus, a homogeneous continuous strip with a resistance close to 50 Ω was obtained. The length of this strip is 100 times greater than its width and its square resistance was 0.5 Ω. The latter is defined as the resistance of an element of the strip, whose length is equal to the width. Silk screen printing offers the possibility of easily varying within a wide range the shape and resistive value of resistance 8. It makes it possible to precisely and inexpensively reproduce the resistive deposit in the case of a mass production of the calorimeter. Finally, the printing cloth determines the thickness of the resistive coating 8. It is therefore possible to obtain a resistance 8 with a thickness of approximately 100 μm. Thus, the thickness of coating 8 is determined as a function of the shape and value of the resistance which it is wished to obtain. It would not fall outside the scope of the invention to use a form other than that shown in FIG. 3 or different thicknesses. It would also not pass beyond the scope of the invention to modify the mixture of inks and polymers as a function of the desired geometry for strip 8 and the resistance value which it is wished to obtain.

As shown in FIG. 2, thermopile 10 has a measuring face 11 in contact with the inner face 9 of the second coating 6 and a reference face 13. Preferably, thermopile 10 occupies at the most 20% of the surface of inner face 9 of second coating 6.

In the embodiment produced, use was made of a rectangular thermopile of approximate dimensions 11.5×9 mm having 132 thermocouples. The second coating 6 and thermopile 10 are assembled by the same procedure as used for assembling the two coatings of the absorbing element 2.

The use of a thermopile instead of a simple thermocouple has the advantage of providing a much greater sensitivity. Thus, it has been found that with a calorimeter according to the invention equipped with a thermopile, a sensitivity of approximately 10 millivolts/Joule was obtained, whereas in the case of calorimeters only equipped with a thermocouple, the sensitivity was only roughly 5 microvolts/Joule.

At 12 in FIG. 2 is shown a thermal element or heat sink maintaining the reference face 13 of thermopile 10 at a reference temperature. Element 12 has an outer face 15 in contact with reference face 13 and an inner face 17. Preferably, thermal element 12 has a mass which is at least five times greater than that of the assembly of absorbing element 2 and thermopile 10, so that the thermal capacitance of element 12 is large compared with that of absorbing element 2 and thermopile 10. Thus, the temperature of the reference face 13 remains stable despite the temperature increase of absorbing element 2. Moreover, the heat transmitted by the temperature rise of absorbing element 2 via the thermopile is very rapidly diffused in the entire mass of element 12 due to the high conductivity thereof. In the embodiment produced, thermal element 12 is in the form of a roughly 8 mm thick, 46 mm diameter aluminium disk. Thermopile 10 and thermal element 12 are also assembled by the procedure used for assembling the two coatings of the absorbing element 2.

Figure 4:
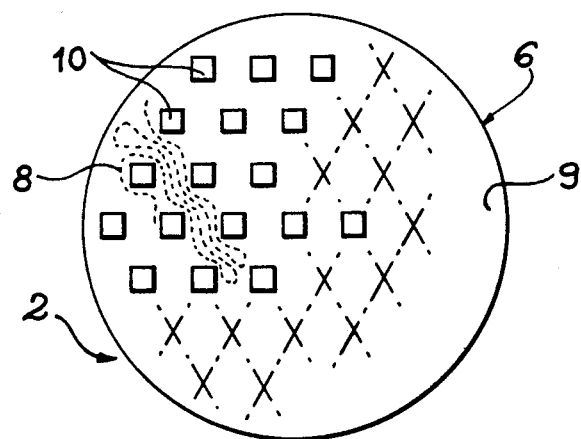
FIG. 4—A view similar to FIG. 3 showing how it is possible to position several thermopiles on the inner face of the absorbing element.

FIG. 4 shows how it is possible to place several thermopiles 10 on the inner face 9 of absorbing element 2, the thermopiles being regularly distributed and covering at the most 20% of the surface of face 9. The calibration resistive deposit 8 is preferably in the form of one or more homogeneous continuous strips placed between thermopiles 10 so as to cover the maximum of the surface not occupied by the piles. The operation of such a device is the same as in the case of a calorimeter only having a single thermopile, because the thermopiles 10 are connected in series.

The main advantage of using several thermopiles is that it is possible to produce a large calorimeter (diameter of several centimetres and even more for the absorbing element). Thus, such a calorimeter can be considered as an assembly of smaller calorimeters, each having a single thermopile.

The main advantage of the calorimeter according to the invention is that the response to an electric pulse is substantially the same as the response to a photon pulse having the effect of depositing the same energy quantity. This is not the case with the prior art calorimeters, as shown in FIGS. 7a to 9b.

Figure 7A:
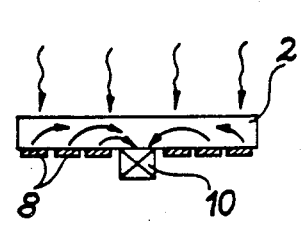
FIGS. 7a and 7b—Respectively a diagrammatic sectional view of the absorbing element of a calorimeter according to the invention with its thermopile and a graph giving the response of said calorimeter to photon and electric pulses.
Figure 7B:
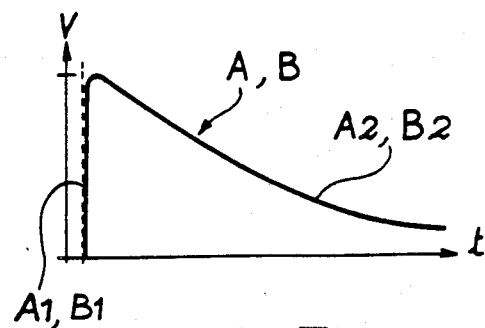

FIG. 7a shows the essential elements of a calorimeter according to the invention, namely absorbing element 2 with, on its inner face, the calibration resistive deposit 8 and thermopile 10. Tests were carried out with a calorimeter like that described hereinbefore and illustrated in FIGS. 1 to 3. For 10 milliseconds it was exposed to a laser beam regulated in such a way that the energy density received by the absorbing element was $2.57 \cdot 10^{-2}$ J/cm$^2$. Curve A of FIG. 7b gives, as a function of time t, the voltage V collected at the thermopile terminals. It can be seen that this curve has a first highly sloping rising part A1 (the maximum being reached after 1 to 2 seconds), followed by a falling exponential part A2 corresponding to the cooling period after the pulse. In the experiment carried out, the time constant of part A2 of curve A was 32 seconds, i.e. the voltage V at the thermopile terminals varied like $e^{-t/32}$, t being the time expressed in seconds. Voltage V is cancelled out after approximately 2 to 3 minutes.

A current regulated in such a way that the energy density received by the absorbing element was, as hereinbefore, $2.57 \cdot 10^{-2}$ J/cm$^2$ was then passed into resistance 8 for 10 milliseconds. The voltage at the terminals of the thermopile was measured and a curve B substantially idential to curve A was obtained.

Figure 8A:
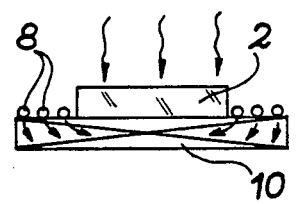
FIGS. 8a and 8b—Views corresponding to FIGS. 7a and 7b for a prior art calorimeter.
Figure 8B:
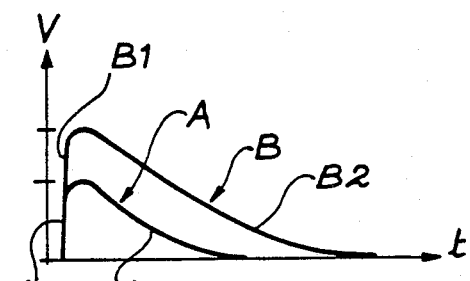

However, this is not the case with the prior art calorimeters, e.g. like that illustrated in FIG. 8a. There is an absorbing element 2 and a thermopile 8 on the inner face thereof, but thermopile 10 is larger than element 2 and the calibration resistance 8 is in the form of a wire bonded to the measuring face of the thermopile in the part not in contact with the absorbing element. Curve A of FIG. 8 represents the voltage at the terminals of the thermopile for a photon pulse and curve B for an electric pulse. The energy received by the absorbing element is the same. Curves A and B have the same configuration with a highly sloping rising part (A1, B1) and an exponential falling part (A2, B2), but the maxima are not the same. The maximum of curve B is greater than the maximum of curve A. It has been found that in this case there is a sensitivity of approximately 4 millivolts/-Joule for a photon pulse and approximately 7 millivolts/Joule for an electric pulse.

Figure 9A:
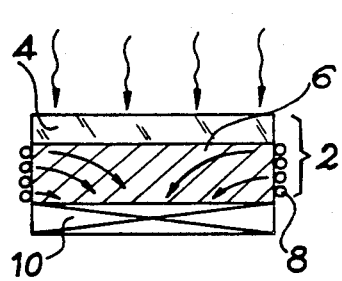
FIGS. 9a and 9b—Views corresponding to FIGS. 7a and 7b for another prior art calorimeter type.
Figure 9B:
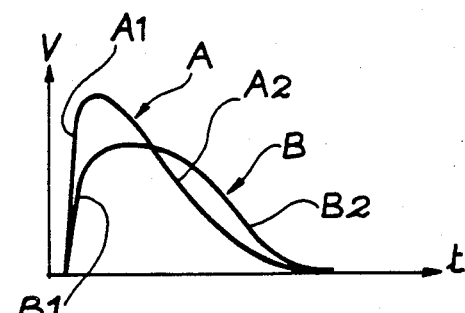

FIG. 9a illustrates another prior art calorimeter in which the absorbing element 2 comprises a glass coating 4 and a metal coating 6. Thermopile 10 occupies all or a major part of the inner face of absorbing element 2 and resistance 8 is in the form of a wire bonded to the peripheral edge of coating 6 and not to the inner face of the absorbing element. Curve A of FIG. 9b shows the voltage at the thermopile terminals in response to a photon pulse. There is once again a highly sloping rising part A1 and the exponential falling part A2. Curve B of FIG. 9b shows the response of the calorimeter to an electric pulse for an identical energy deposit. It is found that the rising part B1 does not slope as sharply as part A1 and that the maximum of curve B is less than that of curve A.

These differences between the invention and the prior art can be explained as follows. In a calorimeter according to the invention (FIG. 7a), the calibration resistance is in the form of a coating deposited on the inner face of the absorbing element and covering most thereof. Moreover, resistance 8 is located on part of the inner face of the absorbing element not occupied by the thermopile. Thus, the heat given off in resistance 8 by the passage of a current is very rapidly transmitted to the absorbing element and heats the mass thereof before reaching the thermopile. Thus, the effect is the same as if the same energy quantity was deposited via radiation striking the outer face of the absorbing element.

In the case of FIG. 8a, the calibration resistance is directly placed on the measuring face of the thermopile in the zone of said face located outside the absorbing element. The heat given off by the passage of a current is consequently directly transmitted to the thermopile and does not heat the absorbing element. If the same energy was supplied by radiation, the absorbing element would firstly be heated and consequently the thermopile temperature would rise less. This explains why the maximum of curve A is below the maximum of curve B (FIG. 8b) and it is consequently necessary to make corrections when it is wished to calibrate the calorimeter.

In the case of FIG. 9a, the energy supplied by radiation firstly heats absorbing element 2 and then thermopile 10. If the same energy is supplied by resistance 8, the heat takes more time to traverse the metal coating 6, because it comes from the peripherary of the latter. Moreover, there are losses because part of said energy is used for heating the glass coating 4. This explains why the slope of part B1 of curve B (FIG. 9b) is less marked than the slope of part A1 of curve A and also why the maximum of curve B is less than the maximum of curve A. There again it is necessary to make corrections when it is necessary to calibrate the calorimeter.

With the present invention, these corrections are unnecessary, because an energy quantity deposited electrically produces the same effect as the same energy quantity deposited photonically.

Wires 14 (FIG. 2) serve to connect the terminals of thermopile 10 to a measuring apparatus, which processes the signal supplied by the thermopile, whilst wires 16 serve to connect the terminals of the calibration resistor 8 to a current supply, which serves to apply energy of a few millijoules to the resistor. This equipment will now be described with reference to FIGS. 5 and 6.

Figure 5:
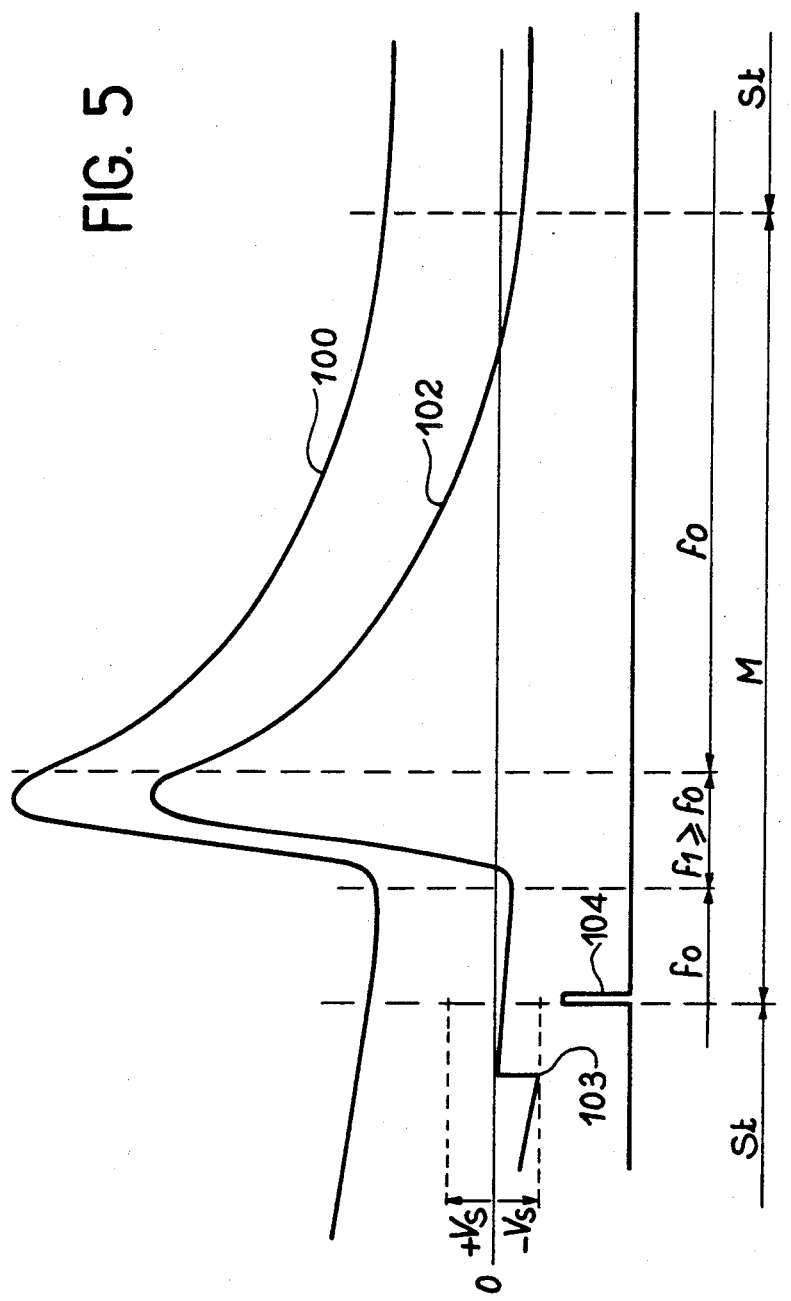
FIG. 5—The shape of the signal supplied by the calorimeter.

FIG. 5 shows the configuration of the voltage supplied by the calorimeter described hereinbefore. This voltage increases rapidly, then passes through a maximum and finally decreases exponentially. In practice, the voltage supplied by the calorimeter can be displaced from zero, even in the absence of incident radiation, so that a means must be provided for correcting said displacement. In FIG. 5, curve 100 shows the evolution of the real voltage supplied by the calorimeter without correction and curve 102 the evolution of the voltage with correction. The latter, which is sometimes called offset correction can intervene as soon as the open-circuit voltage supplied by the calorimeter reaches a threshold of $+V_s$ or $-V_s$. This occurs at point 103 of curve 102. This correction takes place for a stabilization time period St, which precedes and follows each measuring interval. A synchronization pulse 104 indicates that the apparatus is ready for the measurement. A measuring period M then occurs during which the signal is sampled, e.g. at 1024 points. The sampling frequency is not necessarily constant throughout the measuring interval. For example, it is possible to use a relatively low frequency $f_0$ when the evolution of the voltage is slow, i.e. before the radiation pulse reaches the calorimeter and long after it has stopped, and a frequency $f_1$ higher than $f_0$ in the time interval where the voltage varies rapidly, i.e. throughout the phase of growth and passage through the maximum. The frequencies $f_0$ and $f_1$ are between a few and a few dozen Hertz. The time intervals defining these different samplings are counted from the synchronization pulse 104.

Figure 6:
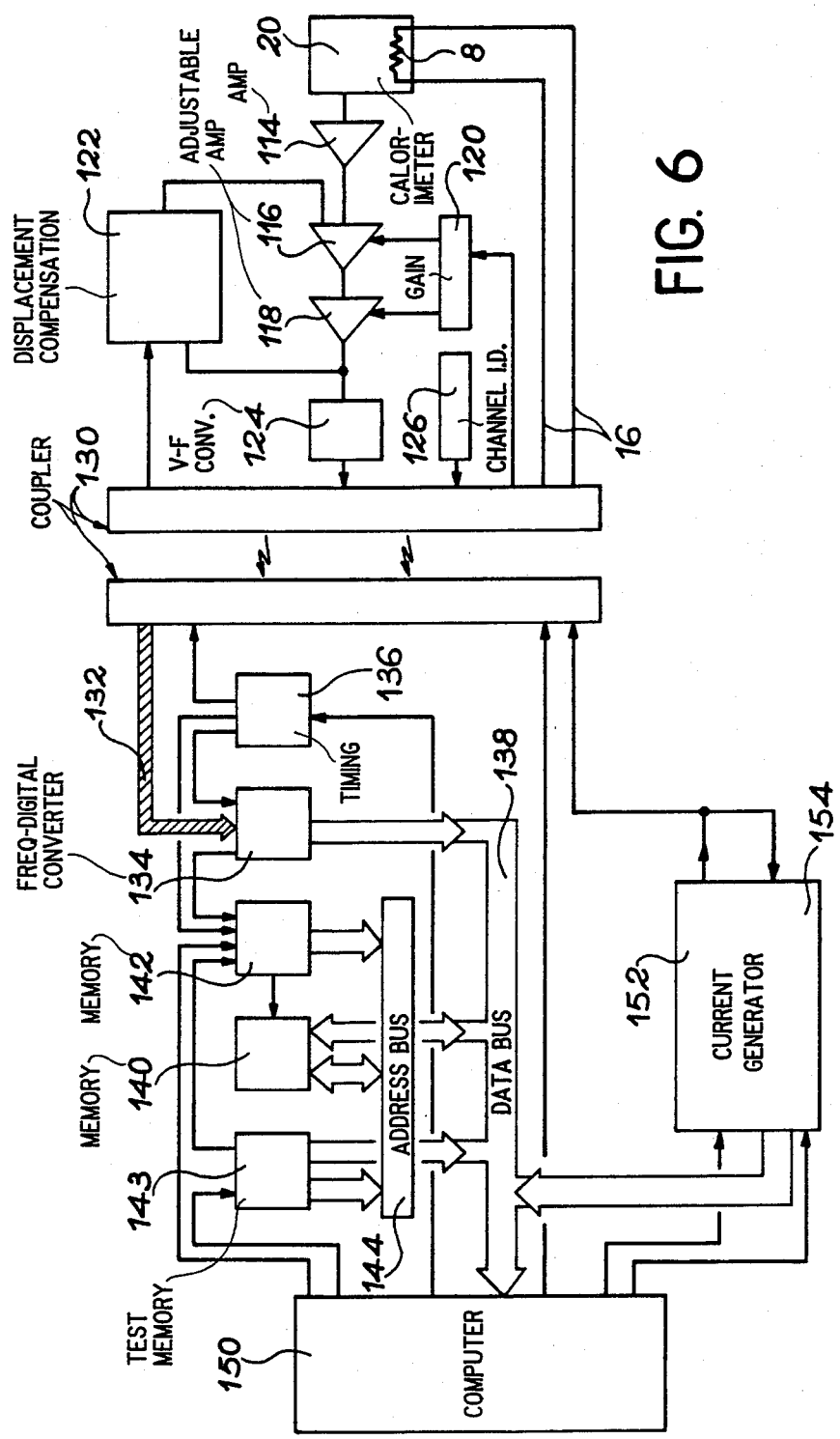
FIG. 6—An embodiment of a circuit for processing the signal supplied by the calorimeter.

FIG. 6 shows a special embodiment of a circuit for processing the signal supplied by the calorimeter 20 according to the invention equipped with its calibration resistance 8. The signal supplied by the calorimeter is applied to a fixed gain (e.g. 50) amplifier 114 and then to two adjustable gain amplifiers 116, 118 by a circuit 120. These gains are e.g. 1, 10, 100, and 1000 for the first amplifier and 1, 2 and 5 for the second. A displacement compensation circuit 122 is connected in parallel on amplifiers 116 and 118. A signal like that of curve 102 of the preceding drawing appears at the output of amplifier 118.

The circuit also comprises a voltage-frequency converter 124, which converts the voltage which it receives into a constant amplitude signal, but whose frequency is proportional to the amplitude of the signal received. The frequency can vary between 0 and 300 kHz. The circuit also comprises a channel identification circuit 126. An optoelectronic coupler 130 receives the different signals from the various channels and transmits them to the digital processing members. This coupler ensures a galvanic insulation between the upstream part comprising the calorimeter and the downstream part comprising the processing means. The signals supplied by coupler 130 are carried by connections 132 to a circuit 134, which is a frequency-digital converter. Such a circuit converts the frequency which it receives into a directly digitally coded sample, e.g. on 12 bits. At the same time, this circuit carries out sampling at a frequency determined by a timing circuit 136. It is the latter which makes it possible to obtain 1024 samples with an appropriate frequency. These samples pass through a data bus 138 to a memory 140, which is addressed by a memory 142 across an address bus 144. There can also be a test memory 143. Finally, the data bus 138 is connected to a computer 150, which processes the digital samples according to different processes (calculation of the peak value, calculation of the surface under the curve, etc.).

The circuit finally comprises a circuit 152 for generating electric energy to be applied to resistor 8 for calorimeter calibration purposes. Moreover, a circuit 154 makes it possible to measure the energy actually applied to the calibration resistor. This energy is typically a few dozen millijoules.

The calorimeter according to the invention has several advantages, the most important of which is that calibration is reliable and easily reproducible making it possible to simulate almost perfectly an energy deposit in the absorbing element. As was stated hereinbefore, this is due to the fact that the calibration resistance is in contact with the inner face of the absorbing element over a large part of the inner face thereof and in a zone not occupied by the thermopile. Thus, the heat given off in the resistance is rapidly transmitted into the absorbing element and heats the mass thereof before reaching the thermopile. Thus, the effect is the same as when the outer face of the absorbing element is struck by radiation for an equal deposited energy. Thus, it is possible to calibrate this calorimeter without carrying out all the corrections which were necessary with the prior art arrangements. Moreover, as this resistance is a coating deposited on the inner face of the absorbing element, it is in direct contact, i.e. in excellent thermal contact, with a major part of the surface of said inner face and there is no danger of unsticking. In the prior art means, the resistance or resistor is constituted by a thin wire bonded to the absorbing element. The heat transmission is not as good, because the contact surface is very small (corresponding to one generatrix of the wire) and there is often a glue film between the wire and the surface on which it is placed. Thus, this pregluing is necessary to secure the wire before covering it with the definite glue coating. It should also be noted that the glue can deteriorate over a period of time and that the wire can become disengaged in places. Thus, the thermal contact is less satisfactory. All these disadvantages are eliminated by the present invention.

Another advantage of the calorimeter according to the invention is that it has a high sensitivity, particularly due to the low calorific capacity of the hot part of the thermopile compared with that of the absorbing element. Moreover, the assembly of the essential components of the calorimeter is an easily reproducible operation. Finally, the calorimeter according to the invention can be used for measuring the energy transported or transmitted by any random electromagnetic radiation or by particle fluxes.

What is claimed is:

1. A calorimeter for measuring energy transported by radiation comprising an absorbing element able to absorb said radiation having at least one outer face exposed to said radiation and one inner face, said element being exposed to a temperature increase during an interaction with said radiation; means for measuring said radiation increase, said measuring means being in contact with a part of a surface of the inner face of the absorbing element; and a selectively heatable calibration resistance on the inner face of the absorbing element, wherein the calibration resistance is in the form of a resistive material coating deposited on a part of the surface of the inner face of the absorbing element for simulating the absorbing element radiation interaction which is not in contact with the measuring means, said coating being in direct contact with said inner face of the absorbing element over at least 50% of the surface thereof.

2. A calorimeter according to claim 1, wherein the coating is in direct contact with the inner face of the absorbing element over at least 70% of the surface thereof.

3. A calorimeter according to claim 2, wherein the coating is in direct contact with said inner face of the absorbing element over approximately 80% of the surface thereof.

4. A calorimeter according to claim 1, wherein the resistive calibration deposit comprises at least one homogeneous continuous strip, which can be supplied with current and which has a length to width ratio of approximately 100.

5. A calorimeter according to claim 1, wherein the constituent material of the resistive calibration deposit comprises at least one conductive ink which is deposited by a screen process printing and which can be polymerized.

6. A calorimeter according to claim 5, further comprising a plurality of thermopiles, each having a measuring face and a reference face, the measuring face being in contact with the inner face of the absorbing element, the plurality of thermopiles covering at most 20% of the inner surface of the absorbing element.

7. A calorimeter according to claim 1, wherein the means for measuring the temperature increase of the absorbing element comprise at least one thermopile having a measuring face in contact with the inner face of the absorbing element and a reference face, said thermopile occupying at most 20% of the surface of the inner face of the absorbing element, means for maintaining the reference face of the thermopile at a reference temperature and means for measuring the voltage at the terminals of the thermopile produced during the interaction of the radiation and the absorbing element.

8. A calorimeter according to claim 7, wherein the thermopile is a semiconductor thermopile.

9. A calorimeter according to claim 7, wherein the means for maintaining the reference face of the thermopile at a reference temperature comprise an element having an outer face in contact with said reference face and an inner face, said element having a mass which is at least five times greater than that of the thermopile.

10. A calorimeter according to claim 1, wherein the absorbing element has, on the side of its inner face, a thin insulating film, the resistive deposit being in direct contact with said film.

11. A calorimeter according to claim 1, wherein the absorbing element comprises a first coating of a material able to absorb the radiation having an outer face exposed to the radiation and an inner face and a second coating of a lateral heat conduction material placed between the first coating and the thermopile and in contact with the inner face of the first coating and with the measuring face of the thermopile.

12. The calorimeter according to claim 1 wherein the energy measured is pulse-type photon energy and the radiation has a wavelength between 0.3 and 2 $\mu$m.

* * * * *